United States Patent [19]

Coury et al.

[11] 3,873,589

[45] Mar. 25, 1975

[54] ISOCYANATE PURIFICATION PROCESS

[75] Inventors: Arthur J. Coury, St. Paul; Douglas D. Cozad, Minneapolis, both of Minn.

[73] Assignee: General Mills Chemicals, Inc., Minneapolis, Minn.

[22] Filed: Nov. 13, 1972

[21] Appl. No.: 306,070

[52] U.S. Cl.. 260/453 SP, 260/453 P, 260/453 AL, 260/553 R
[51] Int. Cl............................................. C07c 119/04
[58] Field of Search................................ 260/453 SP

[56] References Cited
UNITED STATES PATENTS
3,219,678  11/1965  Rober et al. .................... 260/453

3,517,039  6/1970  Wagner et al. ................. 260/453 X

Primary Examiner—Lewis Gotts
Assistant Examiner—Dolph H. Torrence
Attorney, Agent, or Firm—Anthony A. Juettner; Gene O. Enockson; Norman P. Friederichs

[57] ABSTRACT

Organic isocyanates containing carboxylic acid impurities are heat treated to improve the stability thereof. Such heat treatment causes the acid to react with a portion of the isocyanate to yield a higher molecular weight amide product. The isocyanate can be distilled from the said amide product.

8 Claims, No Drawings

ISOCYANATE PURIFICATION PROCESS

The present invention relates to a process for purifying or improving the stability of organic isocyanates. More particularly, it relates to such a process wherein the starting materials are isocyanates containing carboxylic acid impurities.

It was recently discovered that polyisocyanates could be prepared from polymeric fat acids and that such products had various advantageous properties. The said polyisocyanates and polymers prepared therefrom are the subject of U.S. Pat. No. 3,455,883 to Marwan R. Kamal and Edgar R. Rogier. According to said patent the polyisocyanates are prepared by either the phosgene route or the azide route. When prepared by the former process, the diisocyanate has two more carbon atoms than by the use of the azide process starting with the same dimerized fat acid.

The thermal decomposition of an acyl azide (i.e., Curtius rearrangement) is one of the oldest procedures for the preparation of isocyanates. Such decomposition is known to proceed quantitatively in the absence of ultraviolet radiation. The normal synthesis of the acyl azide consists of adding an acetone (or other water soluble organic solvent) solution of the appropriate acyl halide to an aqueous metal azide (i.e., sodium azide) solution, followed by separation of the resulting acyl azide. The major difficulty under these conditions is the hydrolysis of the acyl halide, the acyl azide and any isocyanate which might have formed.

An alternate procedure employing the Curtius rearrangement has been the use of non-aqueous solvent systems containing the acyl halide and the metal azide, with the bulk of the metal salts present as undissolved solids, wherein the reaction is conducted at high temperatures with concomitant decomposition of the acyl azide to the isocyanate. The major disadvantage is the relatively long reaction time, which is on the order of hours.

It was recently discovered that many of the disadvantages of the previous practices involving the Curtius rearrangement could be overcome by a process wherein a solution of an acyl halide in an essentially water immiscible organic solvent is contacted with a metal azide in the presence of a quaternary ammonium salt and sufficient water to allow interchange between the azide ion and the anion of the quaternary ammonium salt. The acyl azide is formed in this single step. The acyl azide containing organic solvent solution is then separated from the metal azide and metal halide containing aqueous phase and heated to decompose the acyl azide to the corresponding organic isocyanate. This process has the advantage of a very short reaction period in the formation of the acyl azide from the acyl halide in contrast to prior art methods involving the use of non-aqueous solvents without the quaternary ammonium salt.

The above-described improved process is the subject of Kenneth D. MacKay, Edgar R. Rogier and Maurice M. Kreevoy application Ser. No. 78,296, filed Oct. 5, 1970 and titled "Isocyanate Preparation." The first step in such process can be illustrated as follows using an acyl chloride, a quaternary ammonium chloride and an aqueous solution of metal azide:

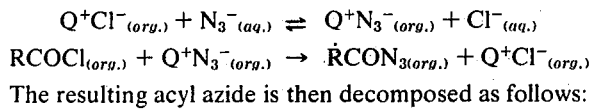

The resulting acyl azide is then decomposed as follows:

The described azide processes produce diisocyanates of two less carbon atoms than the corresponding phosgene process products. However, it was expected that diisocyanates derived from dimerized fat acids would have essentially the same properties regardless of the method of preparation and the slight difference in carbon atom content. This was essentially confirmed as true except in one important respect—stability of the diisocyanates to reaction with certain complex amine derivatives. These latter derivatives have the general formula

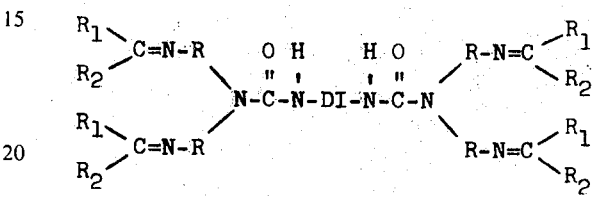

wherein $R_1$ and $R_2$ are organic radicals of 1 to 6 carbon atoms or hydrogen with the proviso that one must be an organic radical, R is an alkylene group of 2 to 6 carbon atoms and DI is the residue of an organic diisocyanate. In the absence of moisture, these derivatives are quite stable and they can be mixed with polymeric fat acid based diisocyanates to also produce relatively stable curable compositions in the said absence of moisture. Quite unexpectedly, it was found that the azide produced diisocyanates yielded much less stable compositions with the described complex polyamines.

We have now discovered a process for purifying polyisocyanates containing carboxylic acid impurities. In brief, such process involves heat treatment and preferably a second step of distillation. The azide process, whether aqueous (i.e., wet) or dry depends to some extent on the purity of the starting acyl halide. Thus such starting material may contain free acid. It also depends on the process steps employed and the quantitative yields. In this regard, there may be acyl halide remaining after completion of the reaction and such acyl halide may be partly hydrolyzed to acid during handling. Further, in the wet processes some of the acyl halide may be hydrolyzed to the free acid which is again found in the isocyanate product. The presence of these impurities, and especially the free acid, reduces the stability of the isocyanates toward reaction with the described complex polyamine derivatives. Our process increases this stability.

It is theorized that our process causes the acid impurities to react with the formed isocyanate to yield amide products of higher molecular weight. This can be illustrated simply by the following reaction sequence

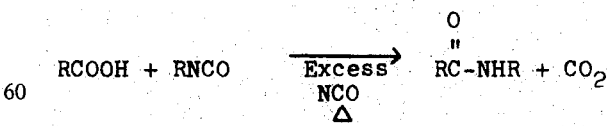

In the preferred aspects of the invention, the free isocyanate product is distilled from the higher molecular weight amide product after the heat treatment step.

Our process can be used to purify or improve the stability of organic isocyanates prepared by azide processing using any organic acyl halide. Such acyl halides may be mono, di, tri or higher in functionality although the dihalides are preferred since they yield diisocyanates which are highly useful commercially for the preparation of polyurethanes, polyureas and the like, through reaction with active hydrogen containing organic compounds. Of the acyl halides the acyl chlorides are preferred because of their more ready availability and/or preparation. The following are representative of various organic acyl halides: aliphatic acyl halides-octanoyl chloride, decanoyl chloride, 10-undecenoyl chloride, dodecanoyl chloride, palmitoyl chloride, oleoyl chloride, stearoyl chloride, cyclohexane acid chloride, suberoyl chloride, sebacoyl chloride, n-decane-1,10-dicarboxylic acid dichloride, n-hexadecane-1,16-dicarboxylic acid dichloride, and the like; aromatic acyl halides-benzoyl chloride, terephthaloyl chloride, isophthaloyl chloride, 1,5-naphthalene diacid chloride, and the like; and complex materials such as the diacid chloride of 1,1,3-trimethyl-5-carboxy-3(p-carboxyphenyl)indan, the chlorides of polymeric fat acids and the like.

One preferred group of acyl halides are the halides of polymeric fat acids. The halogenation or chlorination of the acids can be carried out by conventional procedures using $PCl_3$ and the like. Polymeric fat acids are well known and commercially available. One method of preparation of polymeric fat acids can be seen in U.S. Pat. No. 3,157,681. The preferred polymeric fat acids useful in preparing the starting acyl halides are produced by polymerizing ethylenically unsaturated monobasic carboxylic acids having 16 to 22 carbon atoms or the lower alkyl esters thereof. The preferred aliphatic acids are the mono and polyolefinically unsaturated 18 carbon atom acids. Representative octadecenoic acids are 4-octadecenoic, 5-octadecenoic, 6-octadecenoic (petroselinic), 7-octadecenoic, 8-octadecenoic, cis-9-octadecenoic (oleic), trans-9-octadecenoic (elaidic), 11-octadecenoic (vaccenic), 12-octadecenoic and the like. Representative octadecadienoic acids are 9,12-octadecadienoic (linoleic), 9,11-octadecadienoic, 10,12-octadecadienoic, 12,15-octadecadienoic and the like. Representative octadecatrienoic acids are 9,12,15-octadecatrienoic (linolenic), 6,9,12-octadecatrienoic, 9,11,13-octadecatrienoic (eleostearic), 10,12,14-octadecatrienoic (pseudo eleostearic) and the like. A representative 18 carbon atom acid having more than three double bonds is moroctic acid which is indicated to be 4,8,12,15-octadecatetraienoic acid. Representative of the less preferred (not as readily available commercially) acids are: 7-hexadecenoic, 9-hexadecenoic (palmitoleic), 9-eicosenoic (gadoleic), 11-eicosenoic, 6,10,14-hexadecatrienoic (hiragonic), 4,8,12,16-eicosatetraenoic, 4,8,12,15,18-eicosapentanoic (timnodonic), 13-docosenoic (erucic), 11-docosenoic (cetoleic), and the like.

The ethylenically unsaturated acids can be polymerized using known catalytic or non-catalytic polymerization techniques. With the use of heat alone, the monoolefinic acids (or the esters thereof) are polymerized at a very slow rate while the polyolefinic acids (or the esters thereof) are polymerized at a reasonable rate. If the double bonds of the polyolefinic acids are in conjugated positions, the polymerization is more rapid than when they are in the non-conjugated positions. Clay catalysts are commonly used to accelerate the polymerization of the unsaturated acids. Lower temperatures are generally used when a catalyst is employed.

It is also preferred that the polymeric fat acids used in the preparation of the halides are hydrogenated in order to improve the color thereof. The hydrogenation is accomplished using hydrogen under pressure in the presence of a hydrogenation catalyst. The catalysts generally employed in such hydrogenations are Ni, Co, Pt, Pd, Rh and others of the platinum family. In general, the catalyst is suspended on an inert carrier such as kieselguhr, commonly used with Ni, and carbon, commonly used with the platinum family of catalysts.

The acyl halides are also preferably converted to the organic isocyanates using the quaternary ammonium salt ion transfer process. As such it is preferred that the acyl halides yield azides having nine or more carbon atoms per azide group. An approximate rule of thumb has been that the compounds containing less than nine carbon atoms per azide group may be subject to detonation if not carefully handled physically.

Any of a variety of essentially water immiscible organic solvents may be used in such preferred process. These solvents are preferably the aliphatic, alicyclic or aromatic hydrocarbons such as heptane, cyclohexane, toluene, benzene or a chlorinated hydrocarbon such as methylene chloride, chlorobenzene and the like. The concentration of the acyl halide in the solvent is not critical but preferably varies from about 5 to 30% by weight.

The metal azides which may be employed in the production of isocyanates using the preferred quaternary ammonium salt ion transfer process are the alkali metal or alkaline earth metal azides such as potassium azide, sodium azide and the like. Sodium azide is especially preferred. It is also preferred to use an aqueous solution of the metal azide. The metal azide is used in an amount at least equivalent to the acyl halide. It is additionally preferred to use an excess of the metal azide. As indicated previously, an aqueous solution of the metal azide need not be used if there is sufficient water present from the quaternary ammonium compound or otherwise to allow interchange between the azide ion and the anion of the quat. However, a distinct aqueous phase is highly desirable and preferred to facilitate the separation of the solution of acyl azide from the by-product metal halide salts and any excess metal azide used.

The quaternary ammonium salt has a solubility in the essentially water-immiscible organic solution of at least about 0.0001 molar at ambient room temperatures. However, higher solubilities are preferred. Additionally, it is preferred that the quaternary ammonium salt should have a greater solubility in the essentially water immiscible organic solvent than in water. The general structural formula for simple quaternary ammonium compounds is as follows:

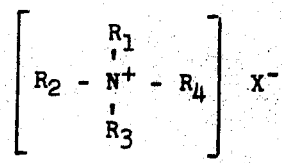

In the present invention, $X^-$ may be halide, sulfate, phosphate, azide, hydroxyl and the like anions. $X^-$ is preferably $Cl^-$ or $Br^-$. $R_1$–$R_4$ may be a variety of organic radicals such as alkyl, aryl and the like. Representative of such radicals are methyl, ethyl, propyl, butyl, pentyl, hexyl, heptyl, octyl, nonyl, decyl, undecyl, dodecyl, hexadecyl, heptadecyl, octadecyl, benzyl and the like. The preferred quaternary compounds are those derived from fat acids and include those which contain from 1 to 4 fat acid residues (i.e., hydrocarbon groups) of up to about 24 carbon atoms. With those quaternary compounds containing less than 4 long chain hydrocarbon groups, the remaining substituents on the nitrogen are preferably short chain alkyl groups of 1 to 4 carbon atoms such as methyl, ethyl, propyl and butyl. When using aliphatic hydrocarbon solvents such as n-heptane, it is especially preferred to use quaternary ammonium chlorides wherein $R_1$–$R_4$ are aliphatic hydrocarbon groups containing a total of about 26 to 30 carbon atoms.

The quaternary ammonium salt is used in an amount sufficient to accelerate the conversion of the acyl halide to the acyl azide. Amounts as low as 0.1 equivalent percent of the acyl halide have given good results. Of course, the quaternary ammonium salt can be used in amounts equivalent to the acyl halide, or even higher. However, there is no particular advantage in using high amounts and there are disadvantages in doing so—i.e., the quaternary compound should be removed prior to the decomposition of the acyl azide to isocyanate to avoid undesired side reactions. Thus the quaternary ammonium salt is preferably used in amounts of from about 0.01 to 10 equivalent % based on the acyl halide.

The first step in the process is carried out at temperatures below the point where there is significant decomposition of the acyl azide to isocyanate. Thus the upper limit will primarily depend on the stability of the acyl azide. Most aliphatic acyl azides have significant rates of decomposition above about 10°C. whereas the aromatic acyl azides have generally higher temperatures of decomposition—i.e., above about 20°C. Accordingly, the first step of the process is preferably carried out at temperatures below about 25°C. and more preferably at temperatures in the range of about 0° to 15°C. The reaction is normally exothermic and thus it is desirable to provide cooling to maintain the temperature at the desired level.

It is also preferred to agitate or stir the reactants during the reaction period. However, such mixing should not be of such an intense nature as to cause the formation of stable emulsions. The reaction is normally complete in less than one half hour, after which period the acyl azide containing organic solution is separated by conventional means from the aqueous phase and/or solid by-product metal salts and metal azide.

The acyl azide containing organic solution is then heated to cause the acyl azide to decompose to the corresponding organic isocyanate. The solvent can then be removed such as by distillation to yield the organic isocyanate product.

Prior to the decomposition reaction, it is desirable to wash the acyl azide containing solution to reduce the amount of quaternary ammonium compounds contained therein. A preferred washing mixture is a 50% by volume acetonitrile-water mixture and the washings can be repeated one or more times and can, optionally, be followed by simple water washing. Water washing alone can be used as well as other wash mixtures or solutions. The preferred wash solution will depend somewhat on the quaternary used.

The isocyanates as above prepared and which contain free acid impurities are then heat treated in accordance with the present invention. Such heat treatment will depend somewhat on the particular isocyanate but will be for a sufficient length of time and at a sufficiently high temperature to cause the free acid to react with a portion of the isocyanate to yield an amide product of higher molecular weight than the isocyanate. For the preferred polymeric fat acid polyisocyanates, temperatures of about 150° to 250°C. are used for from ½ to 18 hours. In specific aspects, heating at a temperature of 200°C. for 2–6 hours has greatly increased the stability of dimeric fat acid diisocyanates.

The heat treatment can be carried out in the presence of a solvent such as above described. Additionally and preferably, the heat treated isocyanates are distilled away from the higher molecular weight amide products to thus further stabilize and purify the said isocyanates.

The following example illustrates a preferred embodiment of the invention without being limiting.

EXAMPLE

A 500 ml. Morton flask containing 6.8 g. (0.105 mole) sodium azide in 27 g. water, 5.0 g. concentrated hydrochloric acid, and 2.5 g. (0.003 mole) of a 48% by weight cyclohexane solution of quaternary ammonium chloride (ALIQUAT 336S which has 28 carbon atoms and wherein the fatty groups were derived from the shorter chain acids of coconut oil and contain 8–10 carbon atoms each) was cooled to about 5°C. in an ice-salt bath. The flask was fitted with a thermometer, mechanical stirrer and jacketed dropping funnel. A solution of 28.9 g. (0.95 mole) dimer acid chloride in 35 ml. n-heptane was then added at such a rate as to maintain the temperature of the reaction mixture below 10°C. (the addition was completed in 20 minutes). The dimer acid chloride had the formula ClOC—D—COCl where D is the 34 carbon atom divalent hydrocarbon radical of the dimerized fat acid obtained by polymerizing, distilling and hydrogenating (in the presence of palladium catalyst) the mixture of fat acids derived from tall oil (composed of approximately 40–45% linoleic and 50–55% oleic, such percents being by weight). The dimer acid chloride contained 0.3 mole % free acid. The reaction mixture was stirred vigorously throughout the dimer acid chloride addition and, after the addition was complete, the mixture was stirred an additional 5 minutes. The contents of the reaction flask then were transferred to a precooled separatory funnel and the layers were separated. The organic layer was washed twice with 100 ml. portions of a 50% (by weight) acetonitrile-water mixture and once with water. After separating, the organic solution was dried over magnesium sulfate, filtered and approximately 50% of the solvent was removed by vacuum distillation at 0–10°C. The residue then was slowly added to 100 ml. of n-heptane which was maintained at about 70°C. Vigorous evolution of nitrogen gas occurred during the decomposition reaction which was very exothermic. The addition was controlled so that the reaction temperature was maintained at about 80°C. without the application of external heat. After the addition was complete and gas evolution had subsided, the solution was cooled to ambient temperature and the solvent was removed by distillation under reduced pressure. The yield of diisocyanate (OCN—D—NCO) was 25.9 g.

(96.7%). The diisocyanate had a purity of 96% (% of isolated product determined as isocyanate by infrared), and an isocyanate content of 13.9% (undistilled-di-n-butyl amine titration).

Portions of the product were heated (1) at 200°C. for 2 hours and (2) at 200°C. for 6 hours. Additionally, portions of the heat-treated products were subjected to wiped film distillation. The untreated diisocyanate and the various treated samples were then mixed in approximately equivalent amounts with a complex polyamine derivative under moisture free conditions and ambient room temperature (about 73°F.). Xylene was used as a diluent to give 77% by wt. solution. These mixtures were poured into Gardner viscosity tubes and increases in viscosity were recorded with time. Pot life was designated as time to Gardner viscosity P (400 centipoise). The complex polyamine derivative had the formula

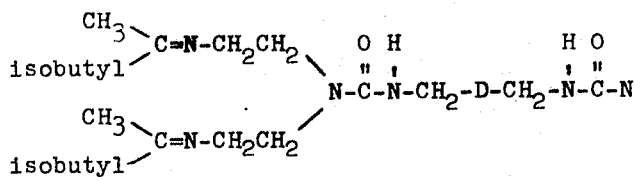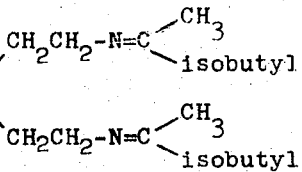

where D is as above described. The results are set forth in the following Table.

Table

| Treatment | Pot Life |
|---|---|
| None | 16–19 min. |
| 200°C., 2 hr. | 2.7 hr. |
| 200°C., 2 hr., distilled | 6 hr. |
| 200°C., 6 hr. | 3 hr. |
| 200°C., 6 hr., distilled | 6 hr. |

The above data show the dramatic increases in stability due to the process of the present invention.

The embodiments of the invention in which an exclusive property or privilege is claimed are defined as follows:

1. A process for increasing the stability of an organic isocyanate prepared by the azide process and containing free carboxylic acid as an impurity comprising heating such isocyanate for a sufficient length of time and a sufficiently high temperature to cause the free acid to react with a portion of the isocyanate to yield an amide product of higher molecular weight than the isocyanate.

2. The process of claim 1 wherein the isocyanate is a diisocyante.

3. The process of claim 1 wherein the starting isocyanate is prepared by a wet azide process.

4. The process of claim 2 wherein the diisocyanate is derived from a dimerized fat acid prepared by polymerizing ethylenically unsaturated monocarboxylic acids of from 16 to 22 carbon atoms.

5. The process of claim 4 wherein the diisocyanate is heated at 200°C. for about 2 to 6 hours.

6. The process of claim 5 wherein the diisocyanate is distilled from the higher molecular weight amide product.

7. The process of claim 1 wherein the isocyanate is distilled from the higher molecular weight amide product.

8. The process of claim 1 wherein said time is between ½ to 18 hours and said temperature is between about 150° and 250°C.

* * * * *